(12) United States Patent
Bessman

(10) Patent No.: US 7,647,861 B2
(45) Date of Patent: Jan. 19, 2010

(54) APPARATUS TO SEAL A SHAFT TO A DIAPHRAGM FOR USE IN DIAPHRAGM ACTUATORS

(75) Inventor: John Carl Bessman, Gladbrook, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 178 days.

(21) Appl. No.: 11/615,406

(22) Filed: Dec. 22, 2006

(65) Prior Publication Data

US 2008/0149877 A1 Jun. 26, 2008

(51) Int. Cl.
*F01B 19/02* (2006.01)
*F16J 3/02* (2006.01)

(52) U.S. Cl. .............................. 92/101; 92/98 R; 92/99

(58) Field of Classification Search ............... 92/93, 92/96, 97, 98 R, 99, 101, 102
See application file for complete search history.

(56) References Cited

U.S. PATENT DOCUMENTS

| | | | | |
|---|---|---|---|---|
| 3,408,899 A | * | 11/1968 | Golden | 92/99 |
| 3,650,181 A | * | 3/1972 | Parr | 92/97 |
| 3,934,480 A | * | 1/1976 | Nederlof | 92/102 |
| 4,049,366 A | * | 9/1977 | Becker | 92/99 |
| 4,774,874 A | | 10/1988 | Adahan | |
| 5,417,143 A | | 5/1995 | Pasek | |
| 7,077,611 B2 | | 7/2006 | Metschke | |

FOREIGN PATENT DOCUMENTS

| | | |
|---|---|---|
| DE | 2452748 | 5/1976 |
| EP | 1101951 | 5/2001 |

OTHER PUBLICATIONS

International Searching Authority, "International Search Report," Issued in connection with International Patent Application Serial No. PCT/US2007/087212, Mailed-May 8, 2008, 5 pages.
International Searching Authority, "Written Opinion of the International Searching Authority," Issued in connection with International Patent Application Serial No. PCT/US2007/087212, Mailed-May 8, 2008, 7 pages.

* cited by examiner

*Primary Examiner*—Michael Leslie
(74) *Attorney, Agent, or Firm*—Hanley, Flight & Zimmerman, LLC.

(57) ABSTRACT

Apparatus to seal a shaft to a diaphragm in a diaphragm actuator are disclosed. An example apparatus for use in a diaphragm actuator has a central aperture and an integral sealing protrusion disposed about a circumference of the central aperture. The sealing protrusion is configured to sealingly engage a shaft of the diaphragm actuator.

18 Claims, 3 Drawing Sheets

APPARATUS TO SEAL A SHAFT TO A DIAPHRAGM FOR USE IN DIAPHRAGM ACTUATORS

FIELD OF THE DISCLOSURE

The present disclosure relates generally to control valve actuators and, more particularly, to diaphragm actuators having a diaphragm sealingly engaged to a shaft of the actuator.

BACKGROUND

Control valves are commonly used in process control systems. In general, a control valve may be used to manipulate a flowing fluid to regulate a processes variable to a desired set point, to convey or deliver a fluid from a source to a destination, etc. A control valve assembly typically includes a valve body, a shaft, and an actuator to provide the motive power via the shaft to operate the valve (e.g., to position a plug or flow control member within the valve).

Spring and diaphragm pneumatic actuators are commonly referred to as diaphragm actuators and are often selected for use with control valves due to their dependability. Diaphragm actuators typically include a casing containing a diaphragm, an actuator shaft, and one or more springs to return the actuator shaft to a known position in the absence of a control pressure applied to the diaphragm. Typically, diaphragm actuators receive a variable gas (e.g., air) pressure on one side of the diaphragm to move the actuator shaft and thereby open and close or modulate a control valve. The control action of the actuator depends on the configuration of the diaphragm, the diaphragm plate, the return springs, and the actuator shaft. Diaphragm actuators can be configured to be direct acting so that an increased control pressure extends the diaphragm and actuator shaft away from the actuator casing. Alternatively, diaphragm actuators can be configured to be reverse acting so that increased air pressure retracts the diaphragm and the actuator shaft.

Regardless of the type of control action for which a diaphragm actuator is configured, the actuator shaft, which may also be referred to as a stem, is mechanically coupled or fastened to the diaphragm. Typically, an end portion of the shaft or stem passes through a central aperture of the diaphragm, and one or more mechanical fastening elements (e.g., washers, nuts, bolts, etc.) are used to clamp or otherwise fix the central portion of the diaphragm to the shaft or stem. In this manner, movements or displacements of the diaphragm in response to control pressure changes cause corresponding movements or displacements of the actuator shaft or stem. To enable a control pressure to be maintained on one side of the diaphragm, the aperture through which the end of the actuator shaft or stem passes is typically sealed to prevent leakage around the shaft or stem through the aperture. However, known techniques for sealing the central aperture of a diaphragm through which a shaft or stem passes typically use a relatively complex and expensive arrangement of washers, o-rings, and specialized components.

SUMMARY

In one described example, a diaphragm for use in a diaphragm actuator has a central aperture and an integral sealing protrusion disposed about a circumference of the central aperture. Additionally, the sealing protrusion is configured to sealingly engage a movable component of the diaphragm actuator.

DETAILED DESCRIPTION

The example apparatus to seal diaphragms to actuator shafts in diaphragm actuators described herein eliminate the relatively complex and expensive sealing apparatus used in many known diaphragm actuators. More specifically, one example described herein includes a diaphragm having a central aperture and an integral sealing protrusion such as a sealing bead disposed about a circumference of the central aperture. The sealing protrusion is configured to sealingly engage a shoulder of a shaft of a diaphragm actuator. In particular, the sealing protrusion (e.g., sealing bead) may engage an annular recess in the shoulder of the shaft, thereby enabling the diaphragm to seal against the shaft without the need to employ a relatively complex and expensive arrangement of additional o-rings, washers, etc., which have traditionally been used to provide such a seal.

Figure 1:
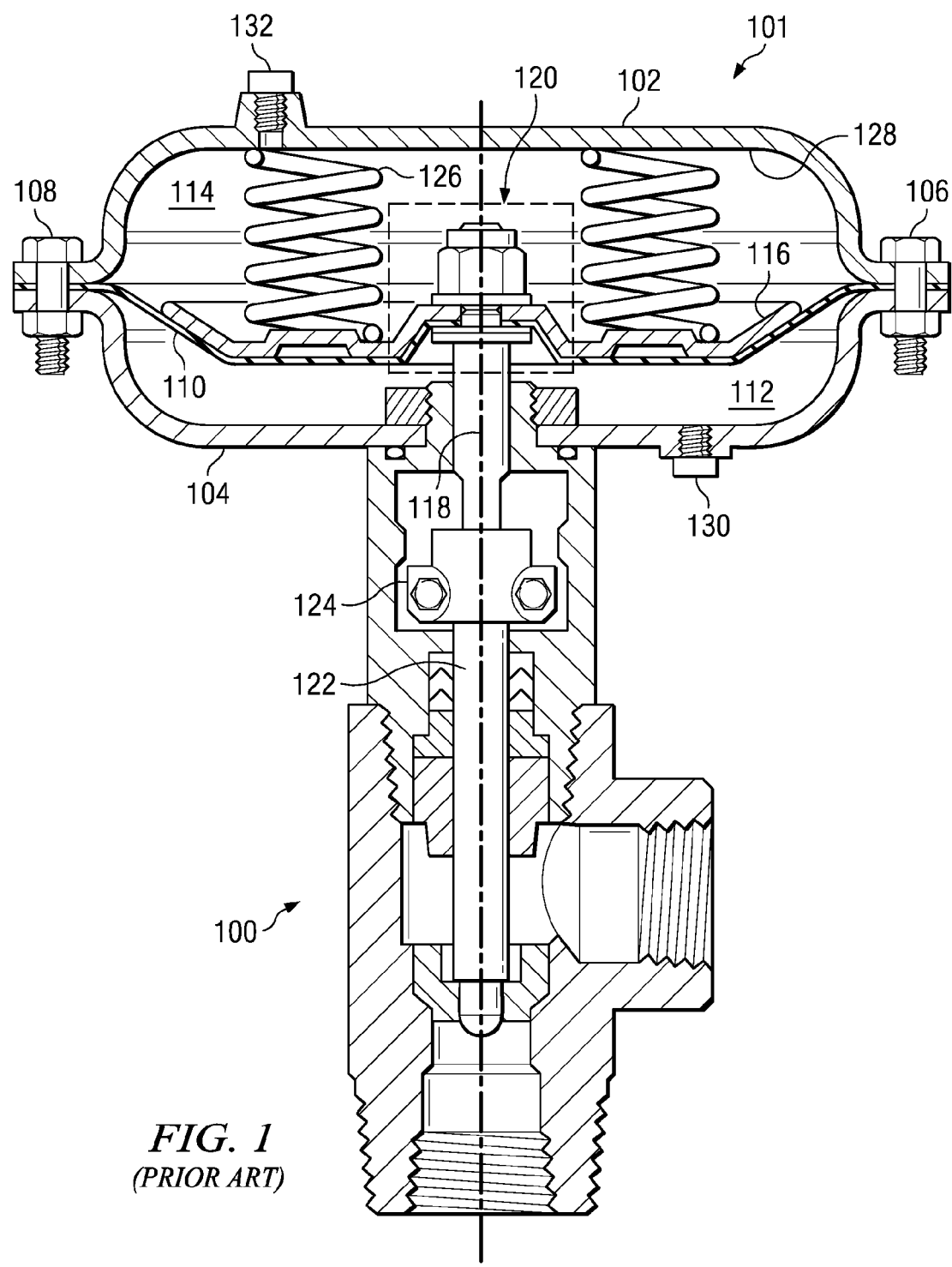
FIG. 1 is a cross-sectional view of a control valve with a known spring and diaphragm actuator.

Before describing the example diaphragm and actuator shaft sealing apparatus mentioned above, a brief description of a known sealing apparatus is provided below in connection with FIGS. 1 and 2. Turning to FIG. 1, a cross-sectional view of a control valve 100 with a known spring and diaphragm actuator 101 is provided. As depicted in FIG. 1, the diaphragm actuator 101 has an upper casing 102 and a lower casing 104, which are coupled together with a plurality of threaded fasteners 106, 108 spaced along an exterior edge of the casings 102 and 104 in a conventional manner. A diaphragm 110 is captured between the casings 102 and 104 and separates the space within the casings 102 and 104 into a control pressure chamber 112 and an atmospheric pressure chamber 114. A diaphragm plate 116 provides a rigid backing for the diaphragm 110 and, as discussed in greater detail below in connection with FIG. 2, facilitates the sealed engagement of the diaphragm 110 to an actuator stem or shaft 118 via a sealing assembly 120. Additionally, the stem or shaft 118 is operatively coupled to a stem or shaft 122 of the control valve 100 via a coupling 124. Compression springs 126 are arranged between the diaphragm plate 116 and an inner wall 128 of the upper casing 102 and, thus, are configured to urge or bias the diaphragm 110, the diaphragm plate 116, and the actuator shaft 118 toward the control valve 100. As a result, the stem or shaft 122 of the control valve 100, which is depicted as a two-way plug valve, is biased to close the control valve 100 (i.e., to inhibit or prevent fluid flow through the valve 100).

In operation, a control pressure signal may be provided to the chamber 112 via a control pressure port 130 to vary the pressure in the chamber 112. At the same time pressure is varied in the chamber 112, the pressure in the chamber 114 is maintained at substantially atmospheric pressure via a port or vent 132. Thus, as pressure in the chamber 112 is increased above atmospheric pressure, the diaphragm 110 is urged and moved toward the upper casing 102 against the forces of the springs 126 to draw the actuator shaft 118 and, thus, the shaft 122 of the control valve 100 toward the upper casing 102, thereby opening the control valve 100. Conversely, as pressure in the chamber 112 is decreased, the diaphragm 110 moves toward the lower casing 104 and, thus, moves the actuator shaft 118 and the shaft 122 to close the valve 100. Although the diaphragm actuator 101 is configured to provide a direct acting control so that increased pressure tends to open the control valve 100, a reverse acting configuration could be employed instead.

Figure 2:
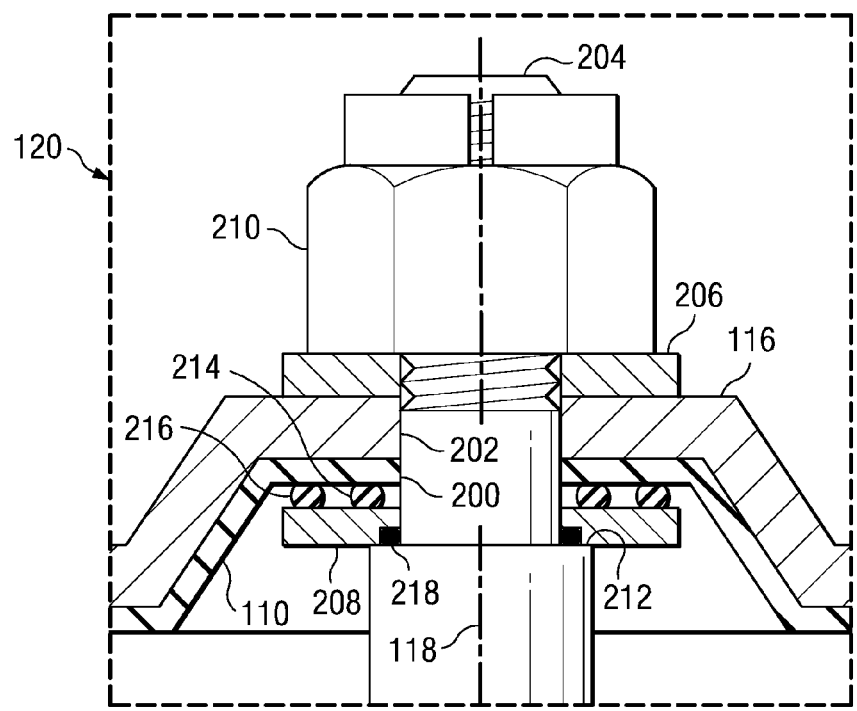
FIG. 2 is an enlarged cross-sectional view of a portion of the known diaphragm and actuator shaft assembly of FIG. 1.

FIG. 2 is an enlarged cross-sectional view of the sealing assembly 120 of the known diaphragm actuator 101 of FIG. 1. As depicted in FIG. 2, the diaphragm 110 and the diaphragm plate 116 have respective central apertures 200 and 202 through which an end 204 of the actuator shaft 118 passes. Washers 206 and 208 sandwich the diaphragm 110 and the diaphragm plate 116 and serve to receive and spread or distribute a compressive sealing force applied via a nut 210 that is threaded onto the end 204 of the shaft 118 and tightened against the washer 206. As can be seen in FIG. 2, the washer 208 is mechanically stopped against a shoulder 212 of the shaft 118 and, thus, as the nut 210 is tightened, increasing compressive force is applied to the washers 206 and 208, the diaphragm plate 116, the diaphragm 110, and o-rings 214, 216 and 218.

More specifically, to seal the aperture 200 of the diaphragm 110, the nut 210 is tightened to compress the o-rings 214 and 216 between the washer 208 and the diaphragm 110 and to compress the o-ring 218 between the washer 208 and the shoulder 212. In this manner, a leakage path through the aperture 200 of the diaphragm 110 can be sealed to facilitate maintenance of a pressure difference between the chambers 112 and 114 of the actuator 101 (FIG. 1). However, as can be appreciated from the depiction of the known sealing assembly 120 shown in FIGS. 1 and 2, a relatively large number and complex arrangement of components are used to seal the aperture 200 of the diaphragm 110. Further, the washer 208 may require special fabrication to provide a chamfer or the like to receive the o-ring 218 and such special fabrication may add significant cost to the sealing assembly 120.

Figure 3:
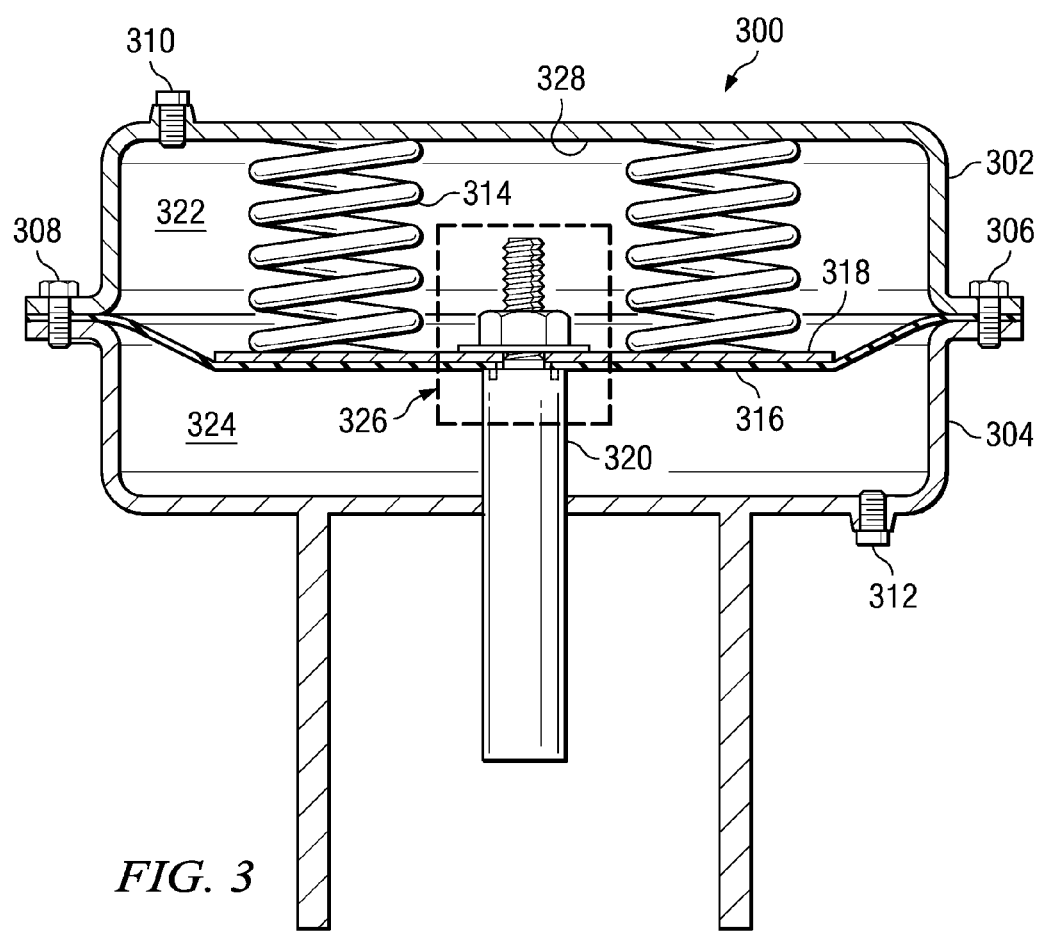
FIG. 3 is a cross-sectional view of an example control valve with a spring and diaphragm actuator having a diaphragm sealingly engaged to a shoulder of an actuator shaft.

FIG. 3 is a cross-sectional view of an example spring and diaphragm actuator 300 that eliminates the need to use additional o-rings and other components that are typically used to seal a diaphragm to an actuator shaft (e.g., the known sealing assembly 120 depicted in FIGS. 1 and 2). With reference to FIG. 3, the diaphragm actuator 300 comprises a diaphragm 316 captured between an upper casing 302 and lower casing 304 coupled together with a plurality of threaded fasteners 306, 308, which secure the casings 302 and 304 at an outer edge. The diaphragm 316 separates the upper and lower casings 302 and 304 into an atmospheric pressure chamber 322 and a control pressure chamber 324. The upper casing 302 is also provided with an air vent 310 to maintain an ambient atmospheric air pressure in the chamber 322. The lower casing 304 is provided with a control pressure inlet 312 to receive a control pressure to vary the pressure in the control pressure chamber 324. A diaphragm plate 318 provides a rigid backing for the diaphragm 316 and, as described in greater detail below in connection with FIG. 4, facilitates the sealed engagement of the diaphragm 316 to an actuator stem or shaft 320 via a sealing assembly 326. Springs 314 are arranged between the diaphragm plate 318 and an inner wall 328 of the upper casing 302. The springs 314 are configured to urge the diaphragm 316, the diaphragm plate 318, and the actuator shaft 320 away from the upper casing 302 and toward a control valve (not shown) that is operatively coupled to the shaft 320. As depicted in the example of FIG. 3, the actuator 300 is configured for direct acting control. However, a reverse acting configuration could be used instead.

Figure 4:
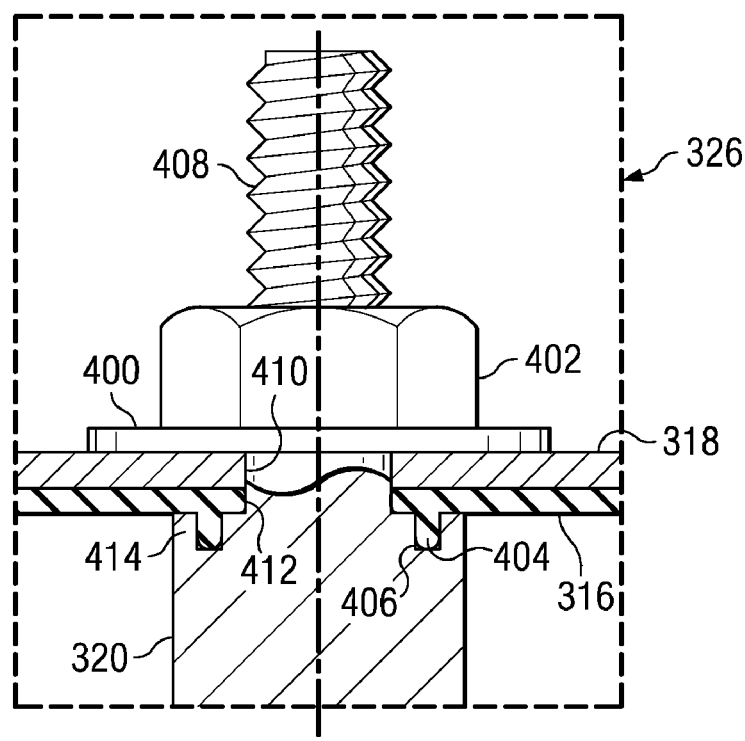
FIG. 4 is an enlarged cross-sectional view depicting a portion of the example diaphragm and actuator shaft assembly of FIG. 3.

FIG. 4 is an enlarged cross-sectional view of the sealing assembly 326 of the example diaphragm actuator 300 of FIG. 3. With reference to FIG. 4, in the sealing assembly 326, the diaphragm 316 is directly sealingly engaged to a shoulder 414 of the shaft 320. More specifically, the diaphragm 316 includes an integral sealing protrusion 404 that is disposed about a circumference of a central aperture 412 of the diaphragm 316. As depicted in FIG. 4, the sealing protrusion 404 is configured as a seal bead having a curved profile that abuts the central aperture 412. However, other geometries and locations of the integral sealing protrusion 404 could be used instead. For example, the sealing protrusion 404 could employ a rectangular profile and/or may be radially spaced or offset from the central aperture 412 to accomplish the same or similar results as the example configuration shown in FIG. 4. The diaphragm 316 is preferably, but not necessarily, made of an elastomeric material and may further include fabric or other reinforcing layers to provide a desired stiffness, strength, life cycle, etc.

Regardless of the particular geometry and location of the integral sealing protrusion 404, the sealing protrusion 404 is configured to sealingly engage and couple to a movable component of a diaphragm actuator. In particular, the sealing protrusion 404 is configured to mechanically couple and sealingly engage the actuator shaft 320. In the example of FIG. 4, the shoulder 414 is substantially perpendicular to the longitudinal axis of the shaft 320 and includes an annular groove or recess 406 configured to receive the sealing protrusion 404. The annular recess 406 is depicted as having a rectangular profile. However, any other suitable profile could be used instead to achieve a mechanical coupling and sealed engagement between the sealing protrusion 404 and the shaft 320. Additionally, while the shoulder 414 is depicted as being substantially perpendicular to the longitudinal axis of the shaft 320, the shoulder 414 could be at any other angle relative to the longitudinal axis of the shaft 320.

An end portion 408 of the shaft 320 is dimensioned or sized to have a relatively smaller diameter than the remainder of the shaft 320 to engage or pass through the central aperture 412 of the diaphragm 316, the central aperture 410 of the diaphragm plate 318, and a washer 400. The end portion 408 of the shaft 320 is further configured to engage or receive at least one fastener such as, for example, a nut 402. In this example, the end portion 408 of the shaft 320 is threaded to receive the nut 402, which is tightened to urge the washer 400, the diaphragm plate 318, and the sealing protrusion 404 against the shoulder 414 of the shaft 320. In this manner, the sealing protrusion 404 is pressed into the annular recess 406 to form a seal between the diaphragm 316 and the shaft 320 and thereby substantially eliminate leakage between the shaft 320 and the diaphragm 316 via the central aperture 412 of the diaphragm 316.

The washer 400 may be configured to have a planar surface with a central aperture. However, other washer configurations and/or additional washers could be used instead. For example, one or more wave washers, Belleville washers, spring washers, etc. could be used instead of or in addition to the washer 400. Further, the washer 400 and/or any additional washers could be made of metal, plastic, or any other suitable material. Additionally, while the fastener 402 is depicted as a single nut, different and/or additional fasteners could be used. For example, a self-locking nut, push nut, and/or any other type of fastener or locking device could be used instead of or in addition to the fastener 402 to hold the diaphragm 316 in a sealed engagement with the shaft 320.

Figure 5:
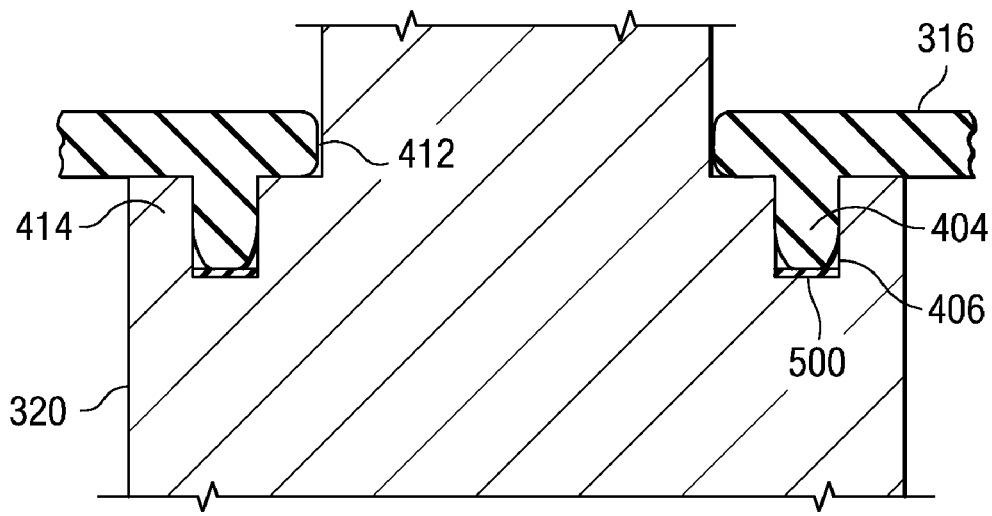
FIG. 5 is an enlarged cross-sectional view depicting an alternative sealing engagement between the diaphragm and shaft of the example sealing apparatus of FIGS. 3 and 4.

FIG. 5 is an enlarged cross-sectional view depicting an alternative sealing engagement between the diaphragm and shaft of the example sealing apparatus of FIGS. 3 and 4. As depicted in FIG. 5, a layer of material 500 is disposed between the sealing protrusion 404 and the annular recess 406. The material 500 may be an adhesive or some other material to facilitate the sealing engagement of the sealing protrusion 404 within the recess 406. Further, the material 500 may line the entire recess 406 or only a portion of the recess 406.

Although certain example apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A diaphragm actuator, comprising:
   an atmospheric pressure chamber;
   a control pressure chamber;
   a shaft having an annular recess at a first end on a shoulder of the shaft, wherein the first end is disposed inside a casing of the diaphragm actuator, and wherein a second end of the shaft extends outside of the casing; and
   a diaphragm having an integral sealing protrusion adjacent a central opening and projecting from a first side of the diaphragm to sealingly engage the annular recess of the shaft to separate the atmospheric pressure chamber from the control pressure chamber, wherein the diaphragm is coupled to a diaphragm plate to provide a rigid backing for the diaphragm and facilitate the sealing engagement of the diaphragm and the shaft.

2. The diaphragm actuator as defined in claim 1, wherein the shoulder comprises a surface that is substantially perpendicular to a longitudinal axis of the shaft.

3. The diaphragm actuator as defined in claim 1, wherein a portion of the shaft is configured to receive at least one fastener to couple the diaphragm to the shaft.

4. the diaphragm actuator as defined in claim 3, wherein the fastener is in the atmospheric pressure chamber.

5. The diaphragm actuator as defined in claim 1, wherein the recess mechanically couples the diaphragm to the shoulder.

6. The diaphragm actuator as defined in claim 1, wherein at least a portion of the integral sealing protrusion is curved.

7. The diaphragm actuator as defined in claim 1, wherein the annular recess has a rectangular profile.

8. The diaphragm actuator as defined in claim 1, further comprising a layer of material between the diaphragm and the annular recess.

9. The diaphragm actuator as defined in claim 1, wherein a first portion of the first end of the shaft is in the control pressure chamber and a second portion of the first end of the shaft is in the atmospheric pressure chamber.

10. A diaphragm assembly for use in a diaphragm actuator, comprising:
    a diaphragm having a central aperture and an integral sealing protrusion radially spaced from a circumference of the central aperture, wherein the sealing protrusion is configured to sealingly engage a movable component of the diaphragm actuator, wherein a first end of the movable component is disposed inside a casing of the diaphragm actuator, and wherein a second end of the movable component extends outside of the casing; and
    a diaphragm plate coupled to the diaphragm, wherein the diaphragm plate provides a rigid backing to support the diaphragm and to facilitate the sealing engagement of the sealing protrusion to the movable component of the diaphragm actuator.

11. The diaphragm as defined in claim 10, wherein the sealing protrusion is configured to mechanically couple to the movable component.

12. The diaphragm as defined in claim 10, wherein the sealing protrusion comprises a seal bead.

13. The diaphragm as defined in claim 10, wherein the central aperture of the diaphragm is positioned to receive the movable component of the diaphragm actuator.

14. A diaphragm actuator, comprising:
    a diaphragm having a seal bead protruding from a first surface of the diaphragm and disposed adjacent a central aperture;
    a shaft having a body that includes a shoulder, having a recess configured to receive the seal bead, wherein a first end of the shaft is disposed inside a casing of the diaphragm actuator, and wherein a second end of the shaft extends outside of the casing; and
    a diaphragm plate coupled to the diaphragm to provide a rigid backing and facilitate the sealing engagement of the seal bead to the shaft, wherein the first end of the shaft passes through the central opening of the diaphragm and receives an inelastic fastener that applies a compressive force to urge the diaphragm plate against the diaphragm and to urge the seal bead into the recess of the shoulder.

15. The diaphragm actuator as defined in claim 14, wherein the recess is sized to receive and seal against the portion of the diaphragm.

16. The diaphragm actuator as defined in claim 14, wherein the shoulder comprises a surface that is substantially perpendicular to a longitudinal axis of the shaft.

17. The diaphragm actuator as defined in claim 14, further comprising a layer of material between the seal bead and the shoulder or the recess.

18. The diaphragm actuator as defined in claim 14, wherein the fastener is a threaded nut.

* * * * *